United States Patent [19]
Musso, Jr. et al.

[11] Patent Number: 5,927,617
[45] Date of Patent: Jul. 27, 1999

[54] DUMP TRUCK BODY WITH A REAR LATERAL CONVEYOR

[76] Inventors: Charles S. Musso, Jr., 8553 Briglin Rd, Hammondsport; Tom Musso, 7153 Peach St., Bath, both of N.Y. 14810

[21] Appl. No.: 08/768,951

[22] Filed: Dec. 18, 1996

[51] Int. Cl.⁶ ..................................................... A01C 3/06
[52] U.S. Cl. .......................... 239/657; 239/675; 239/676; 239/681; 414/526; 414/528
[58] Field of Search ..................................... 239/657, 675, 239/676, 656, 662, 663, 665, 668, 681; 222/166, 565, 608, 626; 298/1 B, 7, 27, 28; 414/501, 502, 526, 528

[56] References Cited

U.S. PATENT DOCUMENTS

| | | |
|---|---|---|
| 2,419,824 | 4/1947 | Davis . |
| 2,421,211 | 5/1947 | Lutz ........................................ 239/657 |
| 2,442,743 | 6/1948 | Wester ..................................... 239/657 |
| 2,484,689 | 10/1949 | Davis . |
| 2,534,558 | 12/1950 | Ottenbacher . |
| 2,879,910 | 3/1959 | Johnson . |
| 2,883,076 | 4/1959 | Palmer ................................ 239/675 X |
| 3,018,908 | 1/1962 | Wilton et al. . |
| 3,122,251 | 2/1964 | Gardipee . |
| 3,125,345 | 3/1964 | Ellis . |
| 3,300,068 | 1/1967 | Tarrant, Sr. . |
| 3,331,519 | 7/1967 | Jennings, Jr. . |
| 3,498,486 | 3/1970 | Freeman, Jr. . |
| 3,553,659 | 1/1971 | Meyer ..................................... 239/657 |
| 3,583,645 | 6/1971 | Murray .................................... 239/657 |
| 4,261,520 | 4/1981 | Hetrick . |

OTHER PUBLICATIONS

Air–Flo Tailgate Spreaders (Brochure).
Monroe Snow & Ice Control Eliminator (Brochure).
Sidewinder (Brochure).

*Primary Examiner*—Andres Kashnikow
*Assistant Examiner*—Steven J. Ganey
*Attorney, Agent, or Firm*—Alix, Yale & Ristas, LLP

[57] ABSTRACT

A truck in accordance with the present invention includes a dump body, a truck frame with a rear axle, a lift system, and a conveying system. The dump body is defined by a unitary floor, a pair of sidewalls which extend tip from opposite sides of the floor, and a front wall and a back wall located on opposite sides of the floor and extending between the sidewalls. The dump body is pivotally connected to the truck frame adjacent to the back wall. The lift system is mounted to the truck frame and the dump body for lifting an end of the dump body proximate the front wall between a lowered resting position on the truck frame and an upper raised position. The conveying system is positioned on the floor behind the rear axle and extends between the pair of sidewalls. The dump body has at least one opening in alignment with the conveying system.

13 Claims, 13 Drawing Sheets

DUMP TRUCK BODY WITH A REAR LATERAL CONVEYOR

FIELD OF THE INVENTION

This invention relates generally to a truck and, more particularly, to a multi-purpose dump body which uses a conventional lift cylinder to move material in the dump body to a lateral conveyor integrated in the floor of the dump body and substantially adjacent to the tailgate, the dump body having at least one opening in alignment with the rear lateral conveyor.

BACKGROUND OF THE INVENTION

Typically, conveyors have been installed in truck bodies to extend between the front wall and the tailgate of the dump body. With these longitudinal conveyors, materials in the dump bodies can be conveyed to the front or rear of the dump body to be dispensed. Some examples of these types of trucks are disclosed in U.S. Pat. No. 4,886,214 to Musso, Jr. et al., U.S. Pat. No. 5,310,119 to Musso, Jr. et al., and U.S. Pat. No. 5,397,172 to Musso, Jr. et al. which are herein incorporated by reference.

However, these types of trucks are not conveniently designed for certain types of side-dispensing applications, such as conveying and windrowing gravel, or other aggregate soil for filling trenches, road shoulders, or ditches or dispensing ice control material over the entire road. Some attempts have been made to construct side dispensing systems, but as explained below these systems are typically difficult and time consuming to install and/or are costly.

For example, one prior solution has been to develop a tailgate attachment which incorporates a conveyor or auger. Some examples of these tailgate attachments are disclosed in U.S. Pat. No. 2,879,910 to Johnson, U.S. Pat. No. 3,018,908 to Wilton et al., U.S. Pat. No. 3,122,251 to Sardipee, U.S. Pat. No. 3,300,068 to Tarrant, Sr., the Monroe Snow & Ice Control Eliminator, and Air-Flo's tailgate spreader which are all herein incorporated by reference. Although these tailgate attachments work, they are not convenient because they require the existing tailgate to be removed and replaced with the tailgate attachment. Since the tailgate attachments are large, bulky, and heavy, the mounting and dismounting operation is often difficult and time consuming. Additionally, the truck owner must buy the additional tailgate attachment which adds to the overall cost of the truck.

Another solution involves modifying the hopper to slope from the front panel and from the rear panel to a central point in front of the rear axle and onto two lateral conveyors, such as disclosed in U.S. Pat. No. 3,498,486 to Freeman, Jr. which is herein incorporated by reference. Although this modification also works for side dispensing applications, it is designed for "hopper-type" vehicles, not dump trucks which have a conventional lift cylinder that can raise one end of the dump body. Since the hopper vehicles do not have a lift cylinder, they cannot raise the hopper to direct material in the hopper towards the conveyors and thus need the sloped panels to redirect the materials. The sloped panels substantially reduce the size of the load which the hopper can carry and require the hopper body to be redesigned which is costly.

Yet another solution, involves a hopper trailer with a two-piece body where the rear body section can be tilted up towards the front of the trailer towards the front body section with a cross conveyor, such as disclosed in U.S. Pat. No. 2,534,558 to Ottenbacher which is herein incorporated by reference. Again, this solution works, but requires a complicated and costly two-piece body design with a two-piece bottom structure to shift the contents of the hopper trailer towards the front. Additionally, it requires the relocation of the lift cylinder to the rear of hopper trailer.

SUMMARY OF THE INVENTION

A truck in accordance with the present invention includes a dump body, a truck frame with a rear axle, a lift system, and a conveying system. The dump body is defined by a unitary floor, a pair of sidewalls which extend up from opposite sides of the floor, and a front wall and a back wall located on opposite sides of the floor and extending between the sidewalls. The lift system is mounted to the truck frame and the dump body for lifting an end of the dump body proximate the front wall between a lowered resting position on the truck frame and an upper raised position. The conveying system is positioned on the floor behind the rear axle and extends between the pair of sidewalls. The dump body has at least one opening in alignment with the conveying system.

The truck with the dump body in accordance with the present invention provides several advantages. For example, the truck is able to dispense aggregate materials in the dump body from either side of the truck without the need for an expensive tailgate, a complicated and limiting body design modification, or the relocation of or addition of another lift system on the truck frame. Additionally, even though the dump body is designed primarily for side dispensing applications, the design does not interfere with or restrict other typically uses for the dump body, such as hauling materials. Further, the truck with the side dispensing system is easy to use.

DETAILED DESCRIPTION

A truck 10 with a dump body 12 in accordance with the present invention is illustrated in FIGS. 1–10. The truck 10 includes the dump body 12 with a front wall 13, a pair of opposing sidewalls 14 and 16, a floor 18, and a tailgate 20, a conveyor system 22, and openings 68. The truck 10 provides a number of advantages, including the ability to dispense materials in the dump body from either side of the truck without the need for an expensive tailgate, a complicated and limiting body design modification, or the relocation of or addition of another lift system on the truck frame 24.

Figure 1:
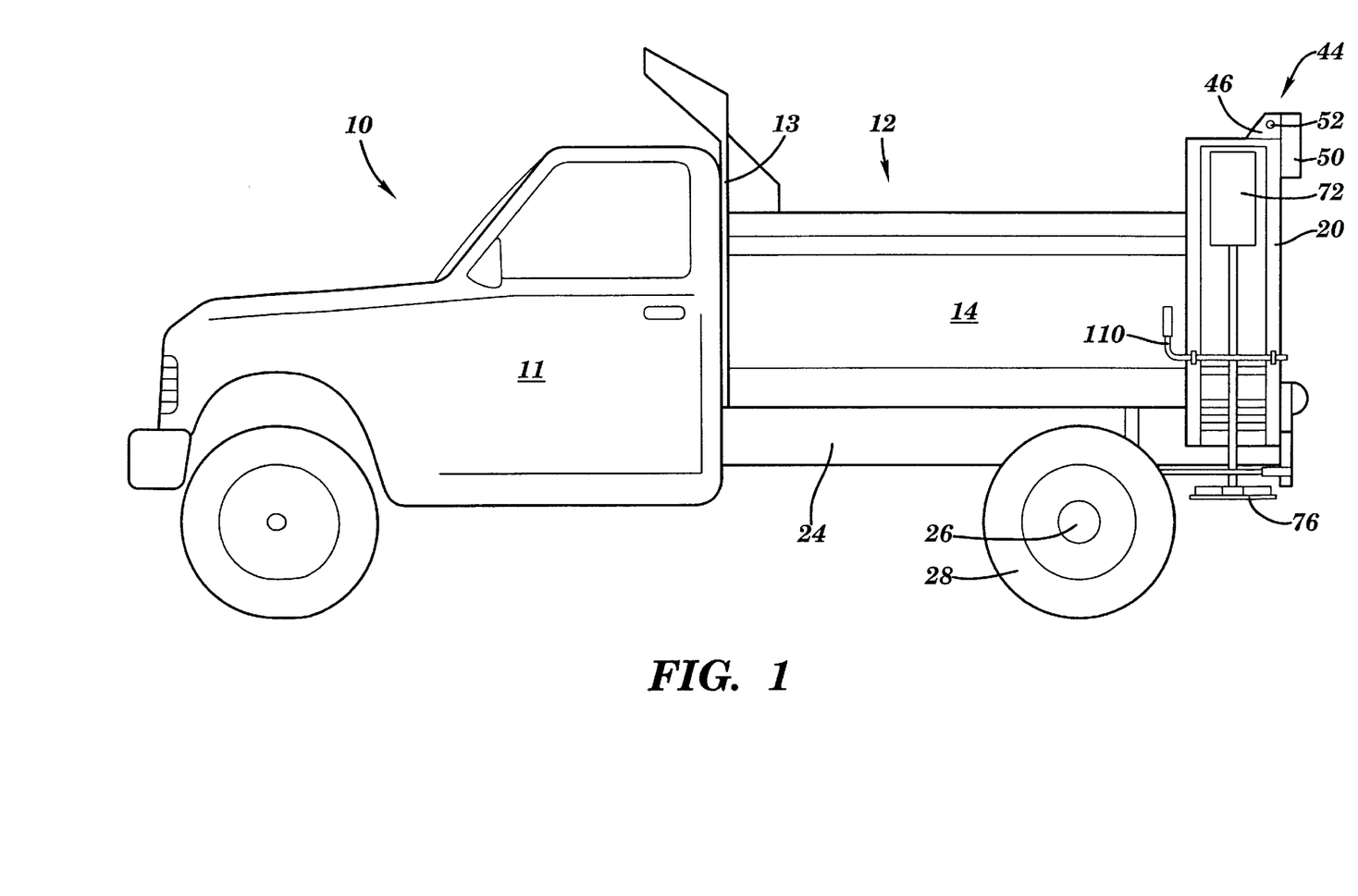
FIG. 1 is a side view of a dump truck with a dump body in accordance with the present invention.
Figure 2:
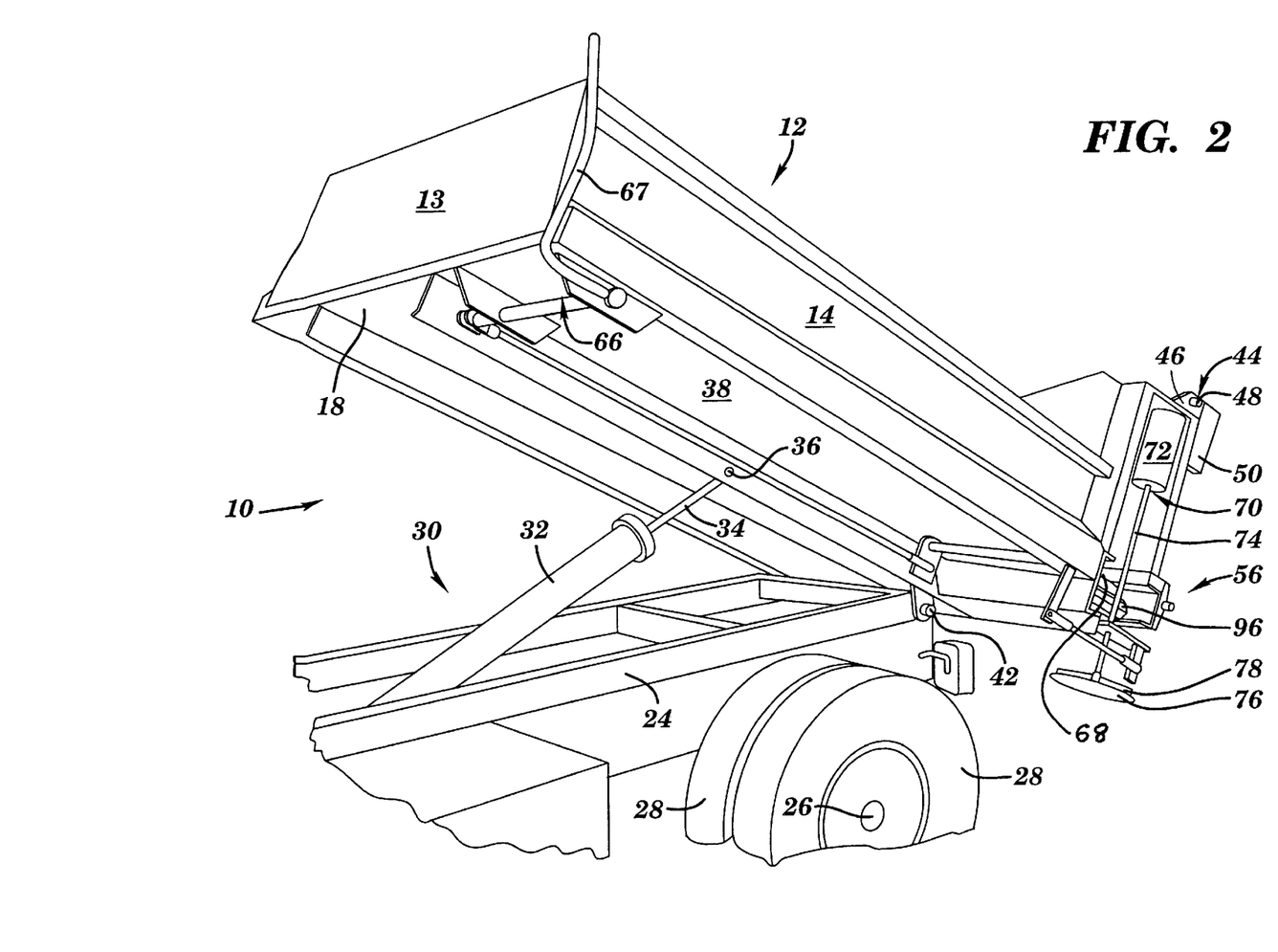
FIG. 2 is a partial driver's perspective view of the dump truck with the dump body in a raised state.
Figure 10:
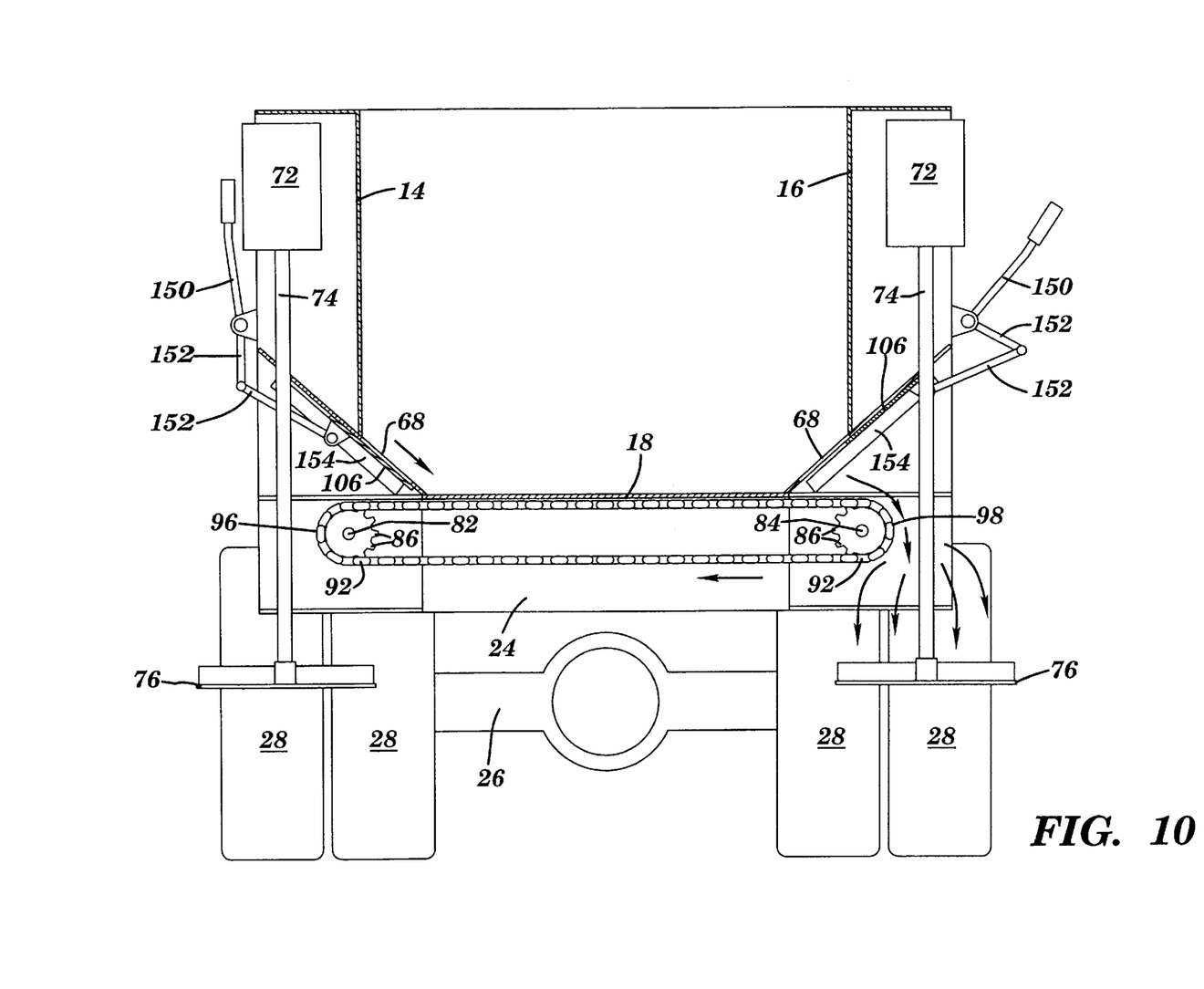
FIG. 10 is a cross-sectional view of the dump body with the conveyor system taken along line 10—10 in FIG. 9.

Referring to FIGS. 1, 2, and 10, truck 10 includes a truck frame 24 with a rear axle 26 and rear wheels 28, a lift cylinder 30, and dump body 12. Rear axle 26 is rotatably secured to truck frame 24 and below dump body 12 and wheels 28 are secured to each end of the rear axle 26 in a manner well known to those skilled in the art. In this particular embodiment, truck 10 only has one rear axle 26, although truck 10 could have more than one rear axle 26, if needed or desired.

Referring to FIG. 2, lift cylinder 30 includes first and second telescoping tubular sections 32 and 34. Second tubular section 34 is seated within first tubular section 32 and can extend in and out from second tubular section 34 in a manner well known to those skilled in the art. One end of first tubular section 32 is pivotally mounted at a pivot point (not shown) to truck frame 24 and one end of the second tubular section 34 is pivotally mounted at a pivot point 36 to outer surface 38 of floor 18. In this particular embodiment, lift cylinder 30 is located beneath dump body 12, although lift cylinder 30 could be mounted in other locations, such as to truck frame 24 and along the outside of front wall 13. A lift cylinder system, such as those shown in U.S. Pat. No. 4,886,214 to Musso, Jr. et al., U.S. Pat. No. 5,310,119 to Musso, Jr. et al., and U.S. Pat. No. 5,397,172 to Musso, Jr. et al., which are herein incorporated by reference, could be used. When lift cylinder 30 is raised, extending second tubular section 34 from first tubular section 32, dump body 12 is raised to pivot up and around pivot points or connections 42.

Figure 3:
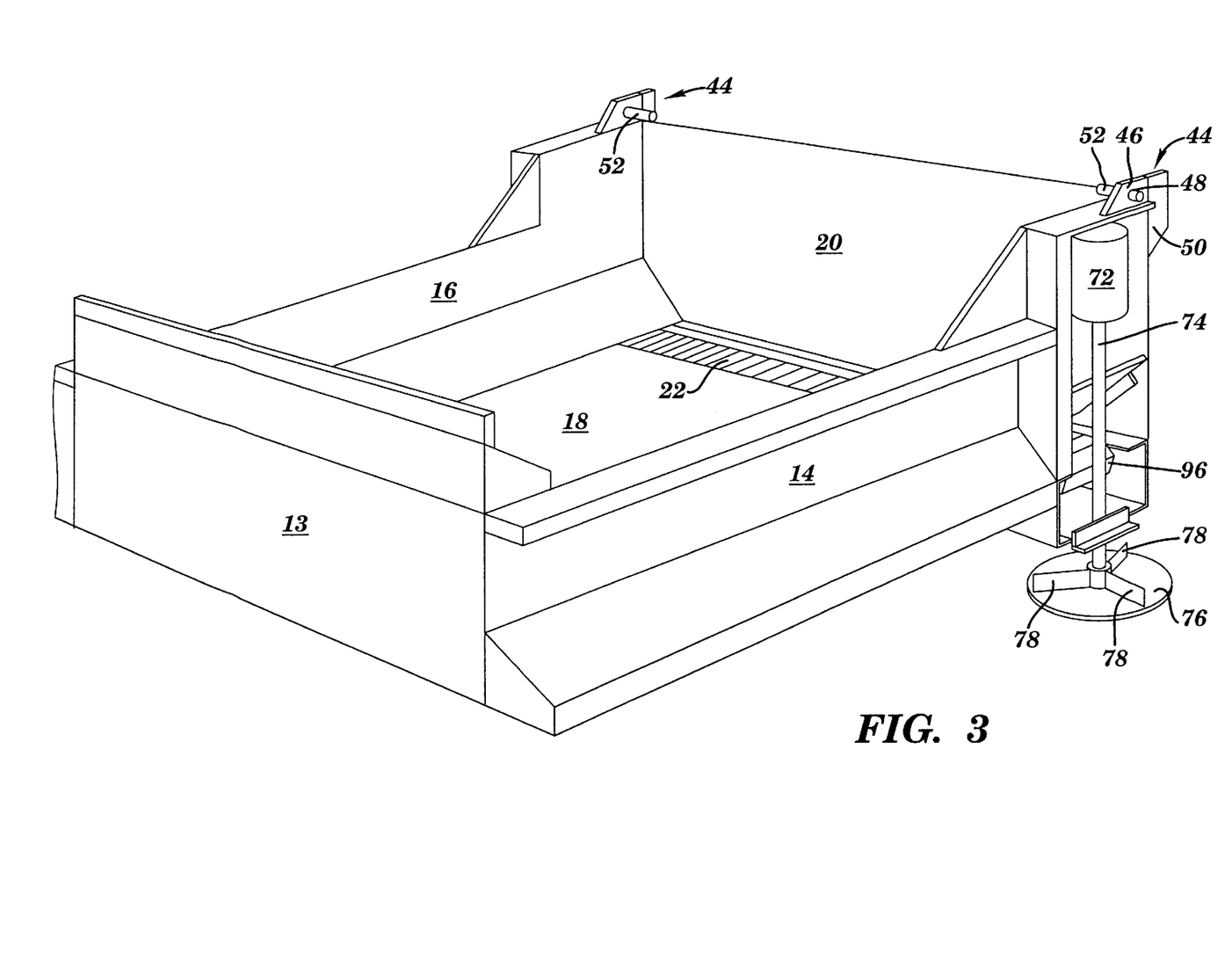
FIG. 3 is a perspective view of the front and driver's side of the dump body.

Referring to FIGS. 1–3, dump body 12 includes a receptacle defined by front wall 13, opposing side walls 14 and 16, and floor or bottom 18. The receptacle is closeable at the back edge of the floor by tailgate or back wall 20, to form one interior space. More specifically, front wall 13 is secured along a lower edge to floor 18 and along opposing side edges to a front edge of each sidewall 14 and 16. Each of the sidewalls 14 and 16 is secured along a lower edge to a side of floor 18. Outer surface 38 of floor 18 proximate to tailgate 20 is pivotally connected at pivot points or connections 42 to truck frame 24.

Referring to FIGS. 1–3 and 7, tailgate 20 is pivotally mounted at pivot points or connections 44 to sidewalls 14 and 16. In this particular embodiment, each pivot point 44 includes a flange 46 with an opening 48, an L-shaped bracket 50, and a pivot pin 52. Each flange 46 extends upwardly from the top of each sidewall 14 and 16 adjacent tailgate 20. Each flange 46 has an opening 48 designed to receive a pivot pin 52. The openings 48 in flanges 46 are located along the same transverse axis. A bracket 50, which in this particular embodiment has an L-shape, is secured at one end to each side of the top of the tailgate 20. The other end of each bracket 50 also has an opening designed to receive pivot pin 52. The opening in each bracket 50 is aligned with the opening 48 in one of the flanges 46 and the pivot pin 52 extends through the openings to create the pivotal point or connection 44. Pivot pins 52 are held in place by a nut, cotter pin, or other securing device. Although one type of pivot connection or point 44 is disclosed, other types of pivotal connections or points could be used, such as that disclosed in U.S. Pat. No. 5,397,172 to Musso, Jr., et al., which is herein incorporated by reference. Although not shown, pivot points may also be provided at the bottom of the tailgate 20, if needed or desired.

Referring to FIGS. 2 and 4–7, the lower end of each tailgate 20 is secured by a latching system 56. In this particular embodiment, latching system 56 includes a bar 58, a fulcrum 60, an elongated member 62 with a notch 64 adjacent one hooked end, linkage 66, and a handle 67. Bar 58 is mounted on tailgate 20 adjacent the lower end and extending out past sidewall 14. Bar engages with notch 64 in elongated member 62. Elongated member 62 is pivotally secured in fulcrum 60 adjacent the one end and is attached to the linkage 66 adjacent the other end. A handle 67 is connected to the other end of the linkage 66. Linkage 66 includes several links which are pivotally connected together in a manner well known to those skilled in the art. Although one type of latching system is disclosed, other types of latching systems could be used, such as the conventional latches disclosed in U.S. Pat. No. 5,397,172 to Musso, Jr., et al., which are herein incorporated by reference.

Figure 4:
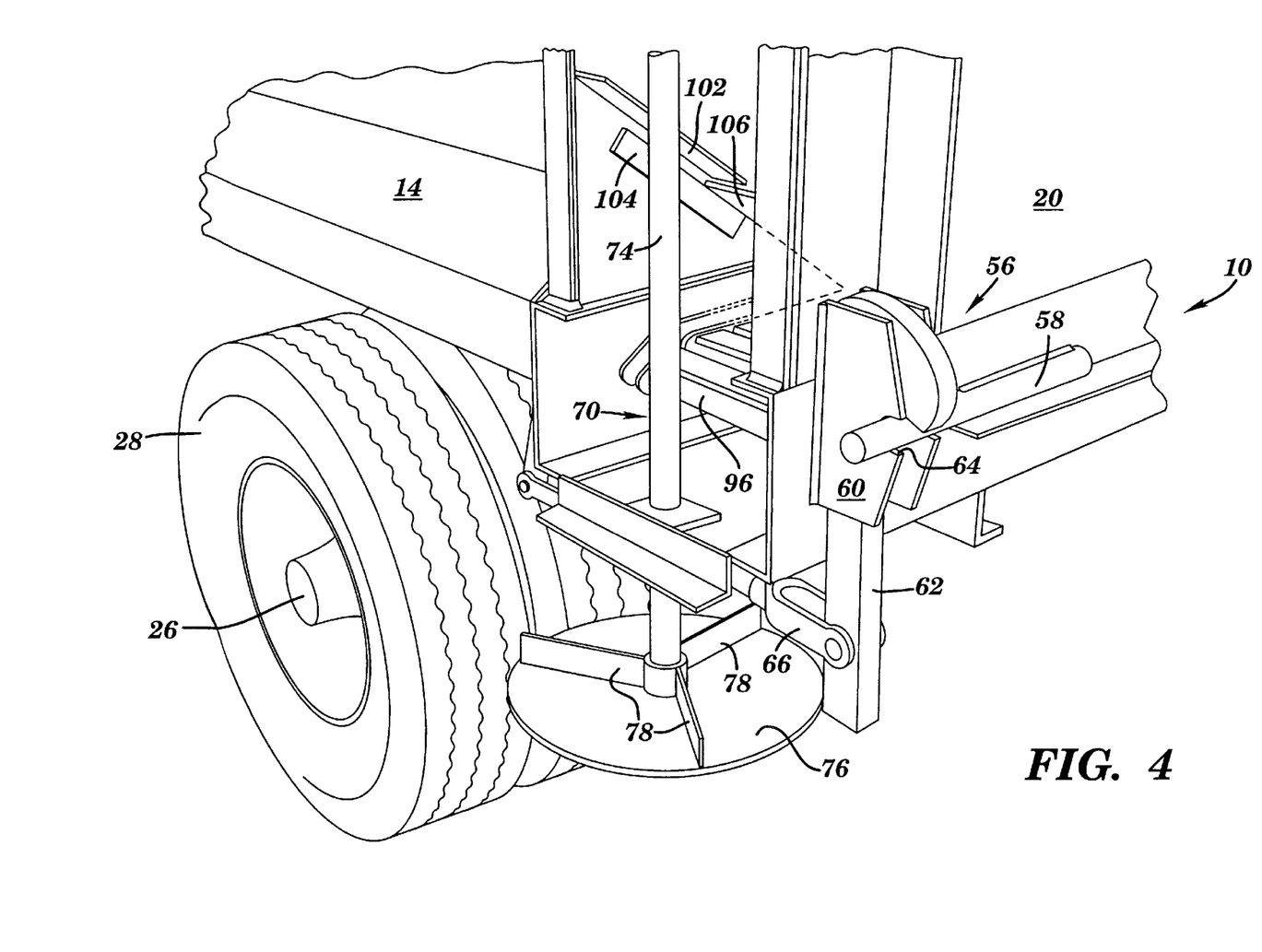
FIG. 4 is an enlarged, partial perspective view of the rear of a sidewall and the tailgate taken from the driver's side of the dump body with the tailgate latch closed.

As shown in FIG. 4, when the handle 67 is pushed in a direction towards the tailgate 20, handle 67 pulls linkage 66 in the direction of the front wall 13. The linkage 66 pulls the other end of the elongated member 62 in the direction of front wall 13. As a result, bar 58 is held in place in notch 64 of the hooked end of member 62 securing the lower end of tailgate 20 in a closed position.

Figure 5:
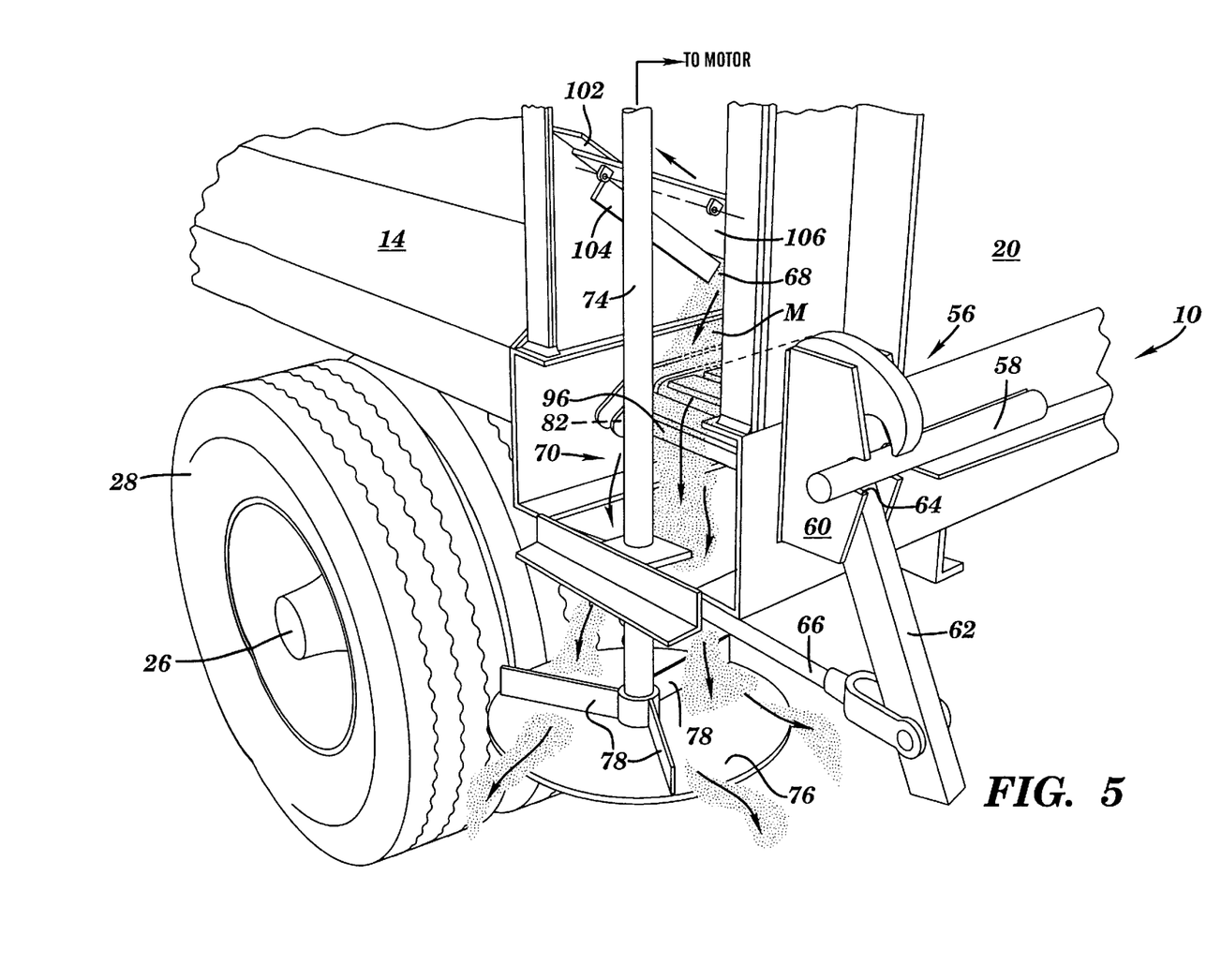
FIG. 5 is an enlarged, partial perspective view of the rear of a sidewall and the tailgate taken from the driver's side of the dump body with the tailgate latch open.

As shown in FIG. 5, when the handle 67 is pulled in a direction away from tailgate 20, handle 67 pushes linkage 66 in the direction of tailgate 20. The linkage 66 pushes the other end of the elongated member 62 in a rearward direction and bar 58 is released from notch 64. When bar 58 is released, tailgate 20 can pivot open around upper pivot points 44.

Figure 11:
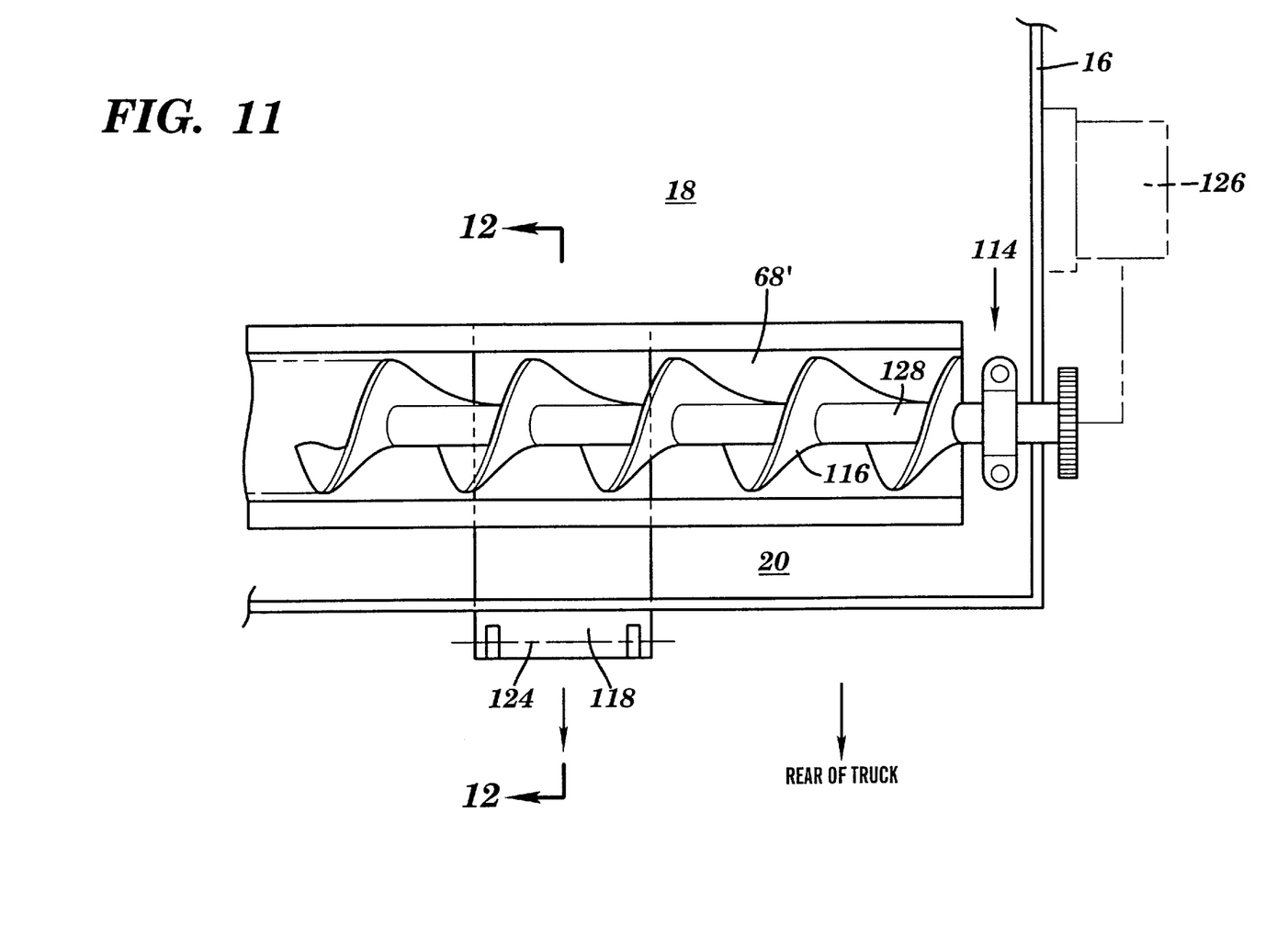
FIG. 11 is a partial, top view of another embodiment of a dump body in accordance with the present invention with an auger system.
Figure 12:
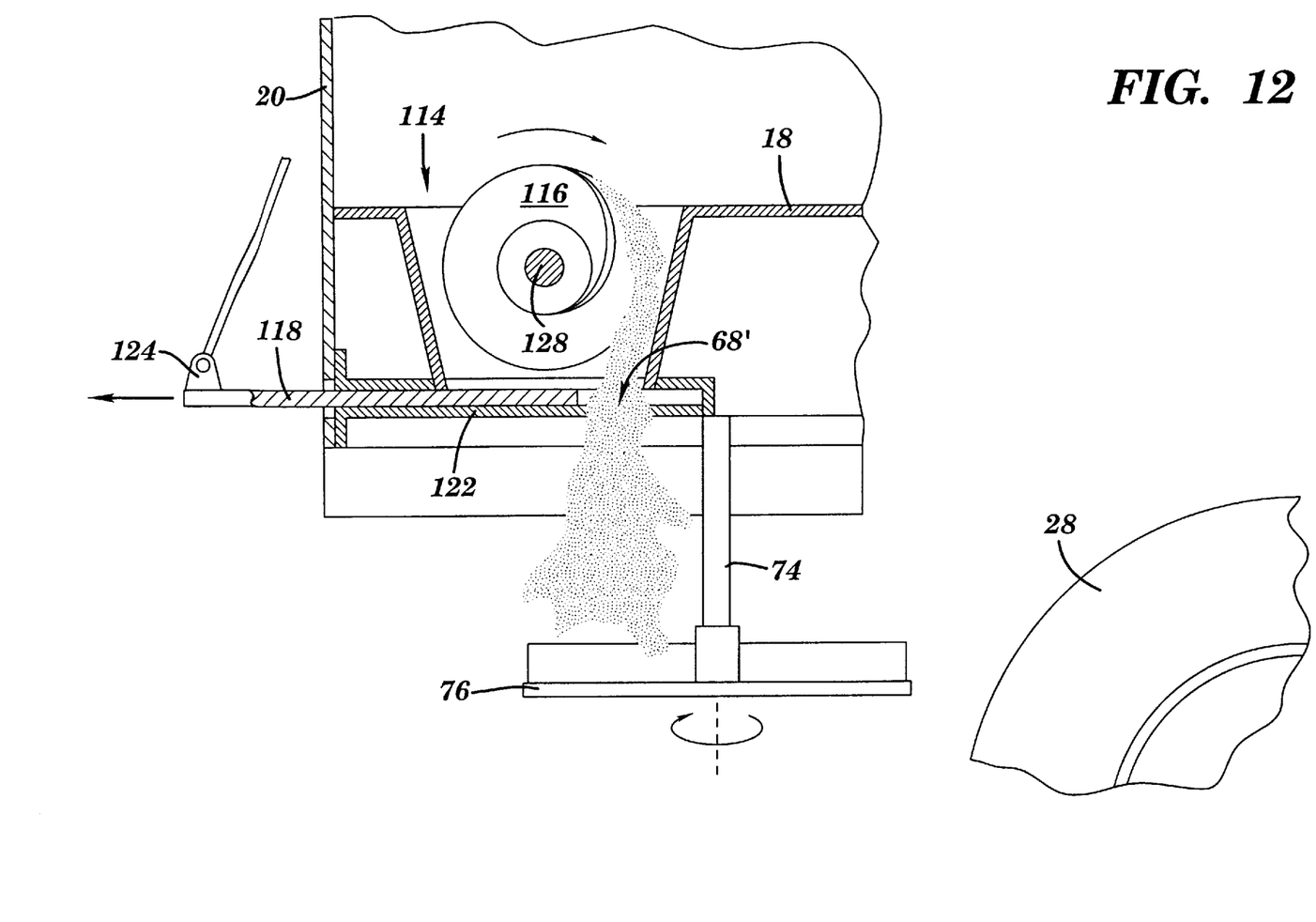
FIG. 12 is a cross-sectional view of the dump body with the auger system taken along lines 12—12 in FIG. 11.
Figure 13:
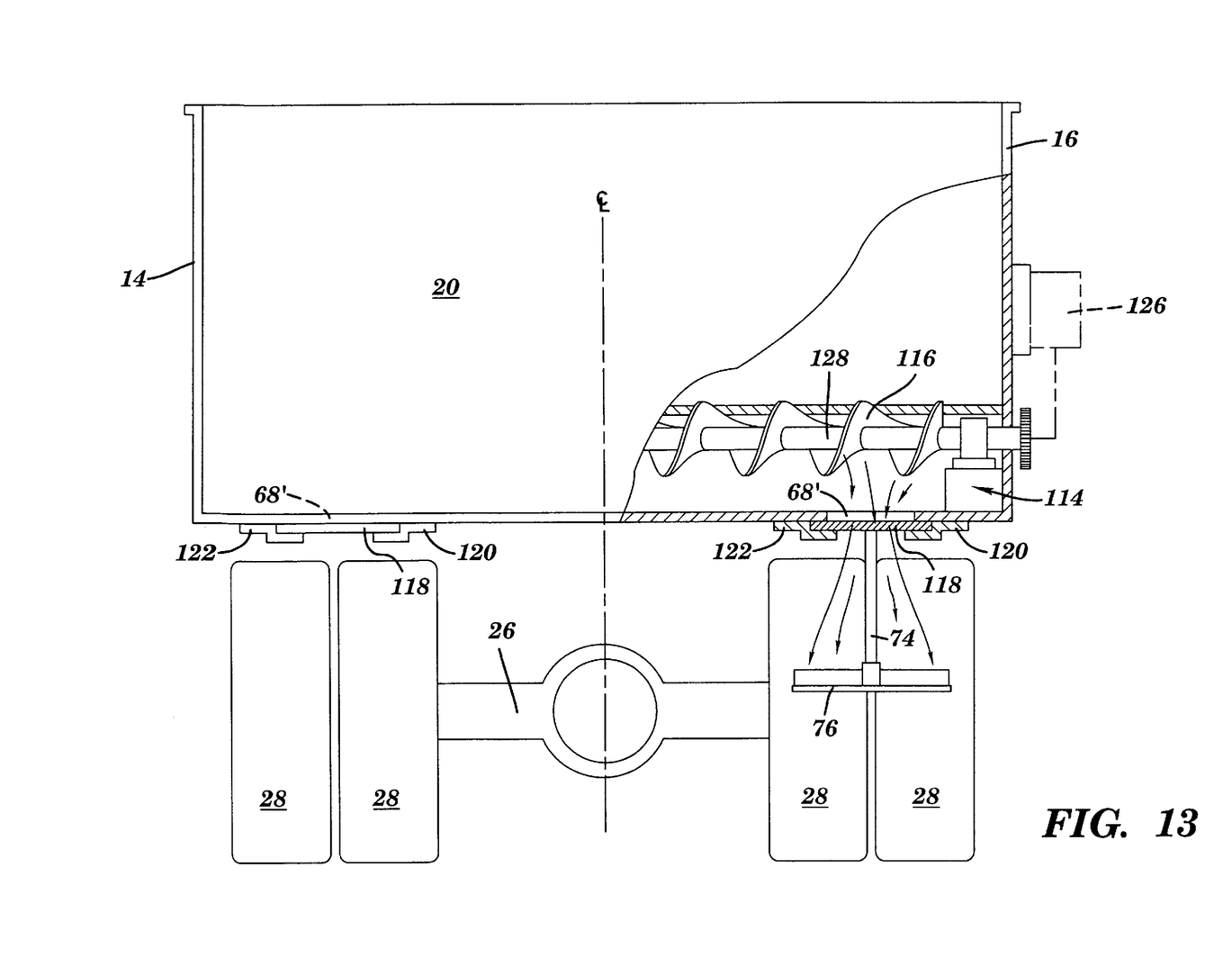
FIG. 13 is a partially broken-away, rear view of the dump body with the auger system.

Referring to FIGS. 2–7, 9, and 10, sidewall 14 includes opening passage 68 which is located behind rear axle 26, preferably adjacent to tailgate 20. If there is more than one rear axle 26, opening 68 should be behind the rearmost axle. Opening 68 extends through sidewall 14 to the interior of dump body 12. In this particular embodiment, both sidewalls 14 and 16 have openings 68, although dump body 12 could be manufactured to only have an opening 68 on just sidewall 14 (as shown in FIG. 2) or just on sidewall 16 (not shown), as need or desired. Each opening 68 is in alignment with (i.e., intersects) the axis of conveyor 80 which extends transversely to the frame longitudinal centerline, and in particular is located proximate to wrap around point 96 or 98 of conveyor 80. As shown in FIGS. 11–13 for the dump body with an auger system, the opening or openings 68' for the conveyor 80 could also be located in floor or bottom 20. If the opening or openings 68' were located in the floor 20, the opening or openings 68' would be below the wrap around point or points 96 and 98.

Locating opening 68 and conveyor 80 behind rear axle 26 and preferably adjacent to the tailgate 20 is advantageous because it enables virtually all of the contents of dump body 12 to be distributed by conveyor 80 out through openings 68 in sidewalls 14 and 16. If openings 68 and conveyor 80 were not located behind rear axle 26, but for example were centrally located in dump body 12, then when the dump body 12 was raised to redistribute the contents of the dump body 12 towards tailgate 20, a portion of the contents would be shifted behind openings 68 and conveyor 80 and could not be distributed out through openings 68. Preferably, the openings 68 and conveyor 80 are spaced about six to twelve inches from the tailgate 20 for optimal operation of the conveyor 80.

As discussed in the background, if openings 68 and conveyor 80 were centrally located as shown in the prior art, then sloped panels would need to be installed in the hoppers to redirect the material back towards the center. These sloped panels reduce the load which the hoppers can carry and add to the cost of the body redesign. Additionally, if openings 68 were located in the front of the dump body 12, then to be able to redistribute the material to the openings 68 in the front either a new lift cylinder 30 would have to be added to the rear of the dump body 12 or the lift cylinder 30 would have to be relocated to the rear of the dump body 12. In either case, the addition of the new lift cylinder 30 or relocation of the lift cylinder 30, is a time consuming and expensive operation and would severely limit the usefulness of the dump body for other operations. The dump body in accordance with the present invention eliminates all of these problems.

As shown in FIGS. 1–7, 10, and 12, a spreader system 70 is secured to each sidewall 14 and 16 and includes a spreader motor 72, a shaft 74, and a broadcast spreader 76 with fins 78. Motor 72 is mounted to the sidewall 14 and 16 above the opening 68. Motor 72 is coupled to a power supply (not shown) and also to a control panel (not shown) which may be located in a cab 11 of the truck 10 and is used to control when the spreader system 70 is engaged and the rate at which the motor 72 rotates shaft 74 and spreader 76. In this particular embodiment, an electric motor is used, although other systems for engaging and driving shaft 74 and spreader 76 could be used, such as a hydraulic system, if needed or desired.

One end of shaft 74 is rotatably secured within motor 72. From this one end, shaft 74 extends down past and in front of opening 68 to broadcast spreader 76 which is secured to the other end of the shaft 74. Broadcast spreader 76 includes a series of fins 78 secured to spreader 76 and spaced at equal distances apart. Fins 78 extend up from spreader 76 at about a ninety degree angle. Spreader 76 is positioned so that as material is dispensed from opening 68 it falls on to spreader 68. Spreader systems are well known in the art, such as those shown in U.S. Pat. No. 4,886,214 to Musso, Jr. et al., U.S. Pat. No. 5,310,119 to Musso, Jr. et al., and U.S. Pat. No. 5,397,172 to Musso, Jr. et al. which are herein incorporated by reference.

Figure 8:
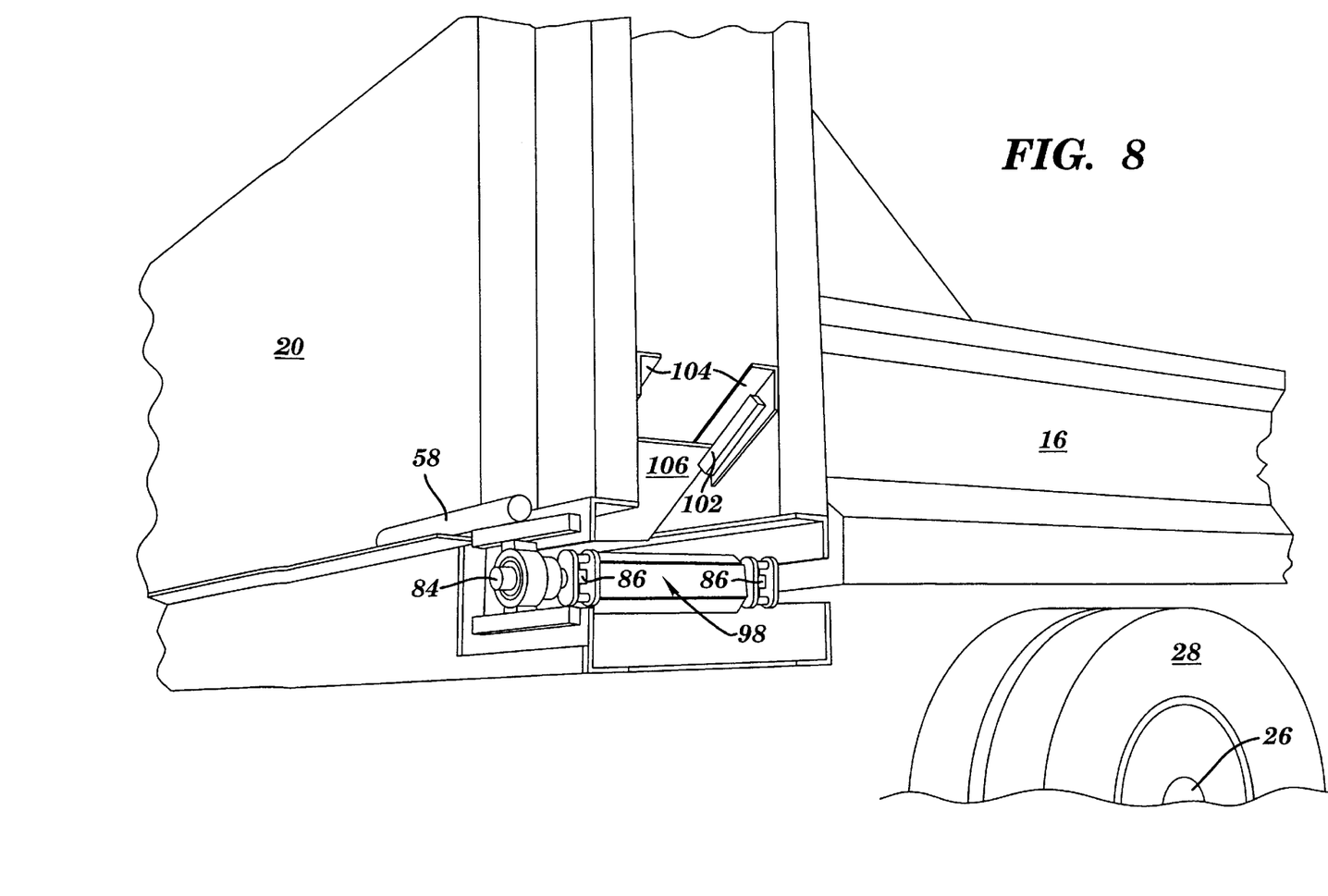
FIG. 8 is an enlarged, partial perspective view of the rear of a sidewall and the tailgate taken from the passenger's side of the dump body.

Referring to FIG. 8, an enlarged, partial perspective view of the rear of sidewall 16 taken from the passenger's side of dump body 12 is illustrated. For ease of illustration, the spreader system 70 and latching system 56 are not shown because they are identical to those on the sidewall 14 on the driver's side. Since sidewall 16 of dump body 12 on the passenger's side is identical to sidewall 14 of dump body 12 on the driver's side, sidewall 16 will not be described here. As discussed earlier, the dump body 12 can be designed with an opening 68 on the sidewall on just the driver's side, the passenger's side, or both sides as shown.

Referring to FIGS. 3, 7, 9, and 10, the conveyor system 22 in this particular embodiment includes an endless conveyor 80, two sprocket shafts 82 and 84 with teeth 86, the conveyor motor 88 for driving the conveyor 80, a driving shaft 90, a power supply (not shown), and a control panel (not shown). Each sprocket shaft 82 and 84 is rotatably secured to dump body 12 below one of the openings 68 and rotates about an axis which is substantially parallel with sidewall 14 and 16. Each end of each of sprocket shaft 82 and 84 has a set of radially extending teeth 86 located around its circumference.

Figure 9:
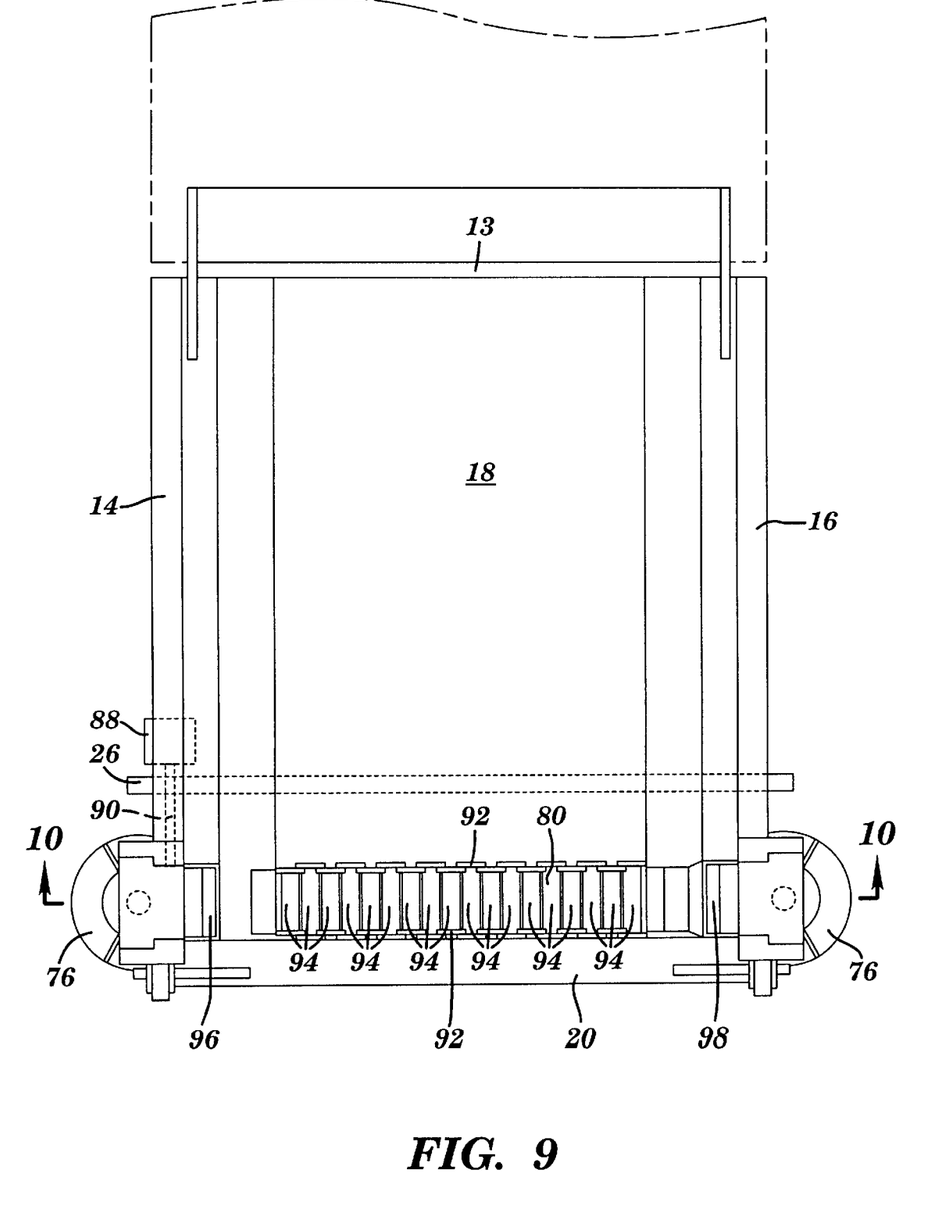
FIG. 9 is a cross-sectional, top view of the dump body with the conveyor system taken along line 9—9 in FIG. 7.

The conveyor 80 includes a pair of chains 92 which are secured together by bars 94 which extend in a substantially perpendicular direction between the chains 92 and are spaced at substantially equal distances apart. The chains 92 are wrapped around and extend between opposing shafts 82 and 84, with the teeth 86 on one side of sprocket shafts 82 and 84 engaged to mesh with chain 92, i.e. seated in openings in chain 92, and the teeth 86 on opposing side of sprocket shafts 82 and 84 engaged to mesh with the other chain 92. Preferably, conveyor 80 is integrated in or seated within a recess in floor 18, e.g. in this particular embodiment the recess is about one to two inches below the plane of floor 18, extends between sidewalls 14 and 16, and is behind rear axle 26, preferably adjacent to tailgate 20.

The endless conveyor 80 wraps around at points 96 and 98. In this particular embodiment, these points 96 and 98 are located adjacent to openings 68 in each sidewall 14 and 16, although conveyor 80 could be installed so that only one of the points 96 or 98 was disposed adjacent one of the openings 68, so that one or both points 96 and 98 was disposed outside sidewalls 14 and 16, or so that one or both points 96 and 98 was disposed inside dump body 12.

Conveyor motor 88 is secured to dump body 12 and is coupled to one of the sprocket shafts 82 by driving shaft 90. Motor 88 is also coupled to a power supply (not shown) and also to a control panel (not shown) which may be located in the cab 11. When motor 88 is engaged, motor 88 rotates drive shaft 90 and sprocket shaft 82 driving conveyor 80. With the control panel, operations such as when the conveyor 80 is engaged, the direction in which conveyor 80 runs, and the rate at which conveyor 80 runs can be controlled in a manner well known to those skilled in the art. In this particular embodiment, an electric motor is used as the drive mechanism, although other systems for driving conveyor 80 could be used, such as a hydraulic system. By changing the direction of rotation of driving shaft 90 and thus of sprocket shaft 82, conveyor 80 can be operated to run in either direction, i.e. either towards the sidewall 14 on the driver's side or towards the sidewall 16 on the passenger's side. As a result, the dump truck 12 can be operated to convey materials from either side, driver's or passenger's side of the truck.

Although one type of conveyor 80 is described, any type of conveyor, such as the conveyors shown in U.S. Pat. No. 4,886,214 to Musso, Jr. et al., U.S. Pat. No. 5,310,119 to Musso, Jr. et al., and U.S. Pat. No. 5,397,172 to Musso, Jr. et al. which are herein incorporated by reference could be used. Additionally, any type of conveyor or moving system, such as an auger system disclosed in U.S. Pat. No. 2,879,910 to Johnson, could also be used.

Referring to FIGS. 11–13, an alternative embodiment for the dump body 12 with an auger system 114 is illustrated. As shown, the dump body 12 with the auger system 114 is substantially the same as the dump body 12 with the conveyor system 22, except an auger 116 would be positioned in floor 18 of dump body 12 where the conveyor 80 is now shown. Like conveyor 80, auger 116 is located in a recess or trough 118 in floor 20 and extends between sidewalls 14 and 16. Auger 116 is located behind the rear axle 26 and is preferably adjacent tailgate 20. In this particular embodiment, the back edge of trough 118 is about six to twelve inches away from tailgate 20. Auger 116 is rotatably connected to opposing sidewalls 14 and 16 in a manner well known to those skilled in the art. Although in this particular embodiment, the ends of auger 116 extends to sidewalls 14 and 16, ends of auger 116 could extend past one or both sidewalls 14 and 16, or one or both ends of auger 116 could be located inside dump body 12.

In this particular embodiment, openings 68' are located in floor 18, although openings 68 could be located in one or both sidewalls 14 and 16 instead, as shown with the dump body 12 with the conveyor 80. Referring to FIG. 11, the floor 18 could have one opening 68' which is centrally located and, is below and in alignment with (i.e., intersects the conveying axis of) the auger 116. As shown in FIG. 13, the floor 18 could also have a pair of openings 68' located proximate side walls 14 and 16 and, below and in alignment with the auger 116. Additionally, the floor 18 could have just one openings 68' located in floor 20 and proximate side walls 14 or 16 and, below and in alignment with the auger 116.

A door 118 may be adjustably secured to the floor 18 below each opening 68' and can be moved from a position covering opening 68', to intermediate positions partially exposing opening 68', to completely exposing opening 68'. In this particular embodiment, a pair of guide rails are secured to floor 18 on each side of opening 68'. Door 118 is slidably seated between guide rails 120 and 122 and floor 18 and can be moved from a position covering opening 68', to intermediate positions partially exposing opening 68', to completely exposing opening 68' by pulling door out by a handle 124 mounted on door 118, as shown in FIG. 12. The amount door 118 is opened helps to control the rate at which material is dispensed from the dump body 12. As illustrated in FIGS. 12 and 13, an optional spreader system 70, which operates as described earlier, may be mounted below each opening 68'.

An auger motor 126 is secured to dump body 12 and is coupled to shaft 128 of auger 116 in a manner well known to those skilled in the art and rotates the shaft 128 and auger 116. Motor 126 is also coupled to a power supply (not shown) and also to a control panel (not shown) which may be located in the cab 11. When motor 126 is turned on, motor 126 rotates shaft 128 and thus auger 116. With the control panel, operations such as when the auger 116 is engaged, the direction in which the auger 116 runs, and the rate at which auger 116 can be controlled in a manner well known to those skilled in the art. In this particular embodiment, an electric motor is used as the drive mechanism, although other systems for driving auger 116 could be used, such as a hydraulic system. By changing the direction of rotation of shaft 128 of auger 116, auger 116 can be operated to run in either direction, i.e. either towards the sidewall 14 on the driver's side or towards the sidewall 16 on the passenger's side. As a result, the dump truck 12 can be operated to convey materials from either side, driver's or passenger's side of the truck.

Figure 6:
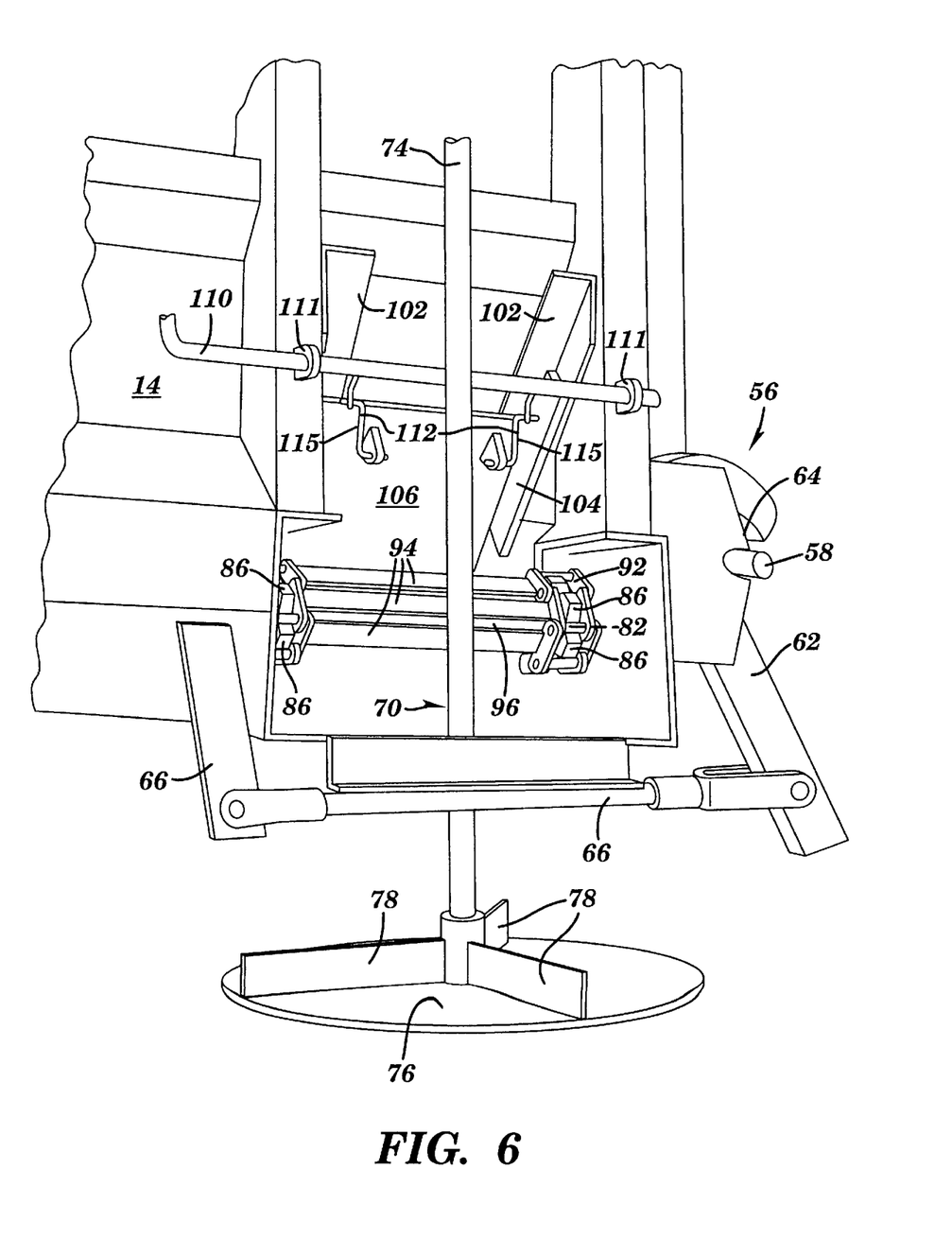
FIG. 6 is an enlarged, partial perspective view of the rear of a sidewall taken from the driver's side of the dump body with the tailgate latch and the door closed.
Figure 7:
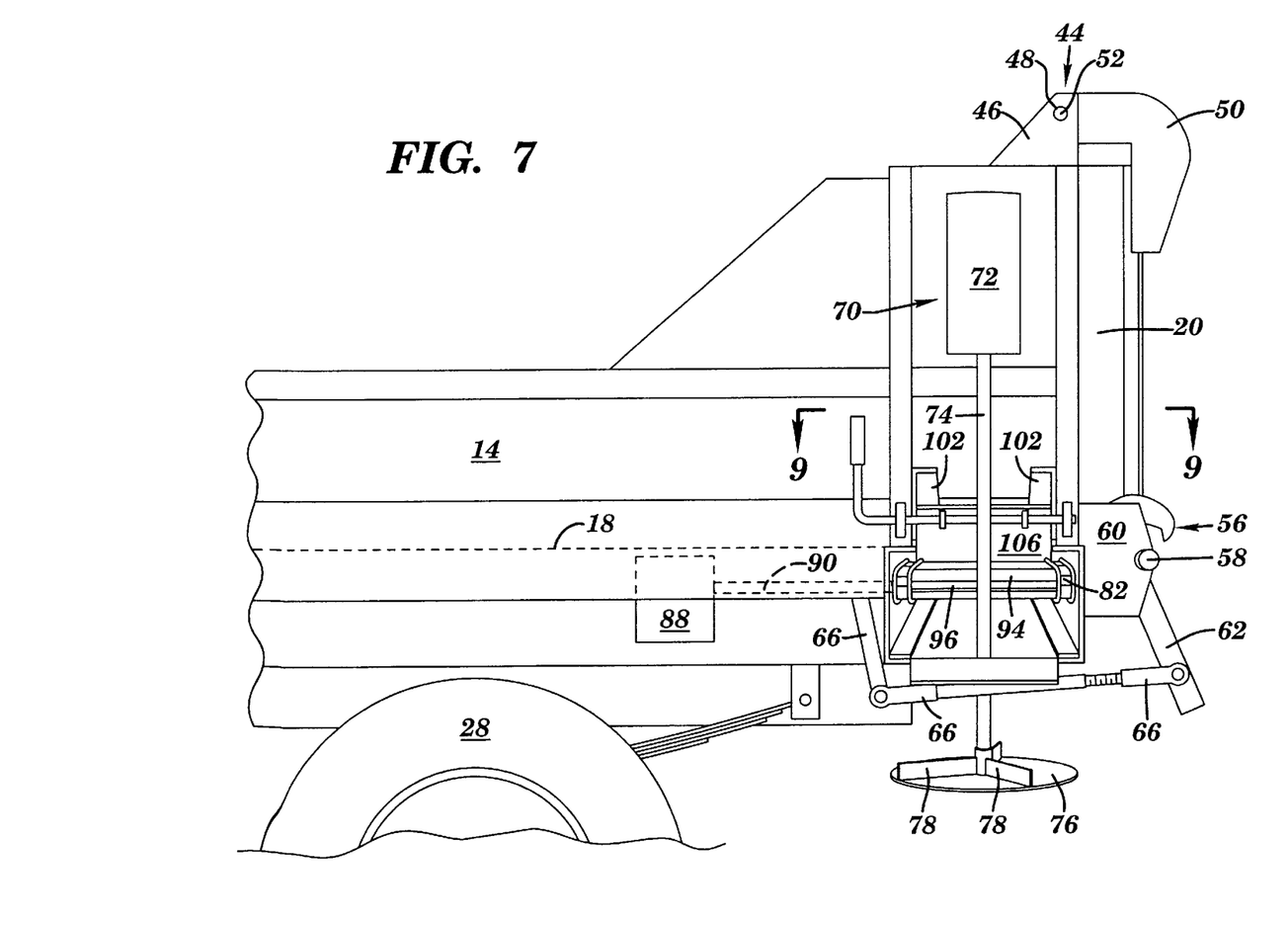
FIG. 7 is an enlarged, partial side view of the rear of a sidewall taken from the driver's side of the dump body with the tailgate latch open.

Referring back to the embodiment of the dump body with a conveyor 80, a door 106 may be adjustably secured to dump body 12 between positions covering and exposing openings 68. Referring more specifically to FIGS. 5, 6, and 8–10, a pair of guide rails 102 and 104 are secured along opposing side edges of each opening 68 in the sidewalls 14 and 16. A door 106 is slidably disposed between rails 102 and 104 and is moveable between a first raised position exposing opening 68 and resting above conveyor 80 by sliding door 106 up and away from conveyor 80 between rails 102 and 104, as shown in FIGS. 5 and 10, and a second lowered position covering the opening 68 and resting on conveyor 80 by sliding door 106 down and towards conveyor 80 between rails 102 and 104 as shown in FIGS. 6, 8, and 10. Door 106 may also be moved to intermediate positions between the firs t raised position and the second lowered position. Door 106 is used to control the size of opening 68 which helps control the rate at which material in dump body 12 is dispensed.

Any type of door operating mechanism which can move the door 106 between the first and second positions, to intermediate positions between the first and second positions, and any kind of door locking mechanism, such as that disclosed in U.S. Pat. No. 5,397,172 to Musso Jr. et. al. which is herein incorporated by reference, can be used. One embodiment for a door operating mechanism is shown in FIG. 6 and includes an L-shaped handle 110 and linkage 112. Linkage 112 includes two sets of two links 115 which are coupled together. With the end of each set of links 115 secured to handle 110 and at the other end of each set of links 115 secured to door 106, proximate the top of door 106. The L-shaped handle 110 is rotatably connected to sidewall 14 above the opening 68 by passing handle 110 through two openings in nubs 111 secured on opposite sides of opening 68. Rotating handle 110 away from sidewall 14 wraps links 115 around handle 110 which pulls door 106 up. Rotating handle 110 toward sidewall 14 unwraps links 115 and lowers the door 106. The door 106 can be held or locked in the first position, and intermediate position, or the second position by any type of suitable locking or clamping mechanism (not shown). For example, nubs 115 could each include another opening and the portion of handle 110 covered by nubs 115 could also have a series of openings. When the opening in nub 115 lined up with one of the openings in handle 110, a pin could be inserted in the aligned openings to secure handle 110 and thus door 106 in place at that location.

An alternative embodiment for the door operating mechanism is shown in FIG. 10. A handle 150 is pivotally secured at one end to sidewall 16. A pair of links 152 are adjustable secured together at one end and at the other ends are secured to handle 150 and to door 106 near the top. A biasing spring 154 is coupled between floor 20 and the bottom end of links 152 secured to door 106. When handle 150 is pulled down, links 152 are pulled together, door 106 is raised, and biasing spring 154 is stretched. When handle 150 is pushed up towards the sidewall, links 152 are extended, door 106 is lowered, and biasing spring 154 is relaxed. Again any type of door locking mechanism could be used to hold door 106 in place, such as a clamp.

The operation of truck 10 with dump body 12 in accordance with the present invention will be discussed with reference to FIGS. 1–13. Dump body 12 is filled with agregate material, such as road salt, gravel, or soil. Truck 10 is driven to the location where the material needs to be dispensed. Depending upon the particular application, the operator opens door 106 in sidewall 14 or 16 on either the driver's side or passenger's side using handle 110 or opens door 118 in floor 18 using handle 124. The amount the operator opens door 106 or door 11 8 will impact the rate at which material is dispensed from dump body 12. The operator will then fasten or lock door 106 or 118 in place.

The operator will then engage conveyor 80 or auger 116 to began conveying in the direction of open door 106 or open door 118. The material M in the dump body 12 is conveyed through the opening 68 in the sidewall 14 or 16 or opening 68' in floor 18 with the open door 106 or open door 118 for gravity dispensing from the dump body receptacle. If truck 10 has a spreader system 70, the operator will also engage the spreader system 70 on the same side of the truck 10 as the opening 68 or 68' where the door 106 or 118 has been opened. The broadcast spreader 76 is disposed beneath opening 68 or 68' and material M from opening 68 or 68' falls onto spreader 76 and is dispersed by the rotating fins 78. The speed of rotation of broadcast spreader 76 can be adjusted as needed or desired.

When the contents in dump body 12 adjacent tailgate 20 are dispersed or nearly dispersed, the operator will stop the truck 10, disengage conveyor 80 or auger 116 and spreader system 70 and raise lift cylinder 30 to raise dump body 12 around pivot points 42, as shown in FIG. 1. Raising dump body 12 redistributes the material M in dump body 12 to the rear of truck 10 and adjacent tailgate 20. Since openings 68 and conveyor 80 or openings 68' and auger 116 are located behind rear axle 26 and preferably adjacent to tailgate 20, a sloped panel from tailgate 20 to conveyor 80 or auger 116 is unnecessary. Once the material is redistributed, dump body 12 is lowered and the operator can resume the operations discussed above for side dispensing applications.

Having thus described the basic concept of the invention, it will be readily apparent to those skilled in the art that the foregoing detailed disclosure is intended to be presented by way of example only, and is not limiting. Various alterations, improvements and modifications will occur and are intended to those skilled in the art, though not expressly stated herein. These modifications, alterations and improvements are intended to be suggested hereby, and are within the spirit and scope of the invention. Accordingly, the invention is limited only by the following claims and equivalents thereto.

What is claimed is:

1. A truck for hauling and dispensing material, the truck comprising:
    a truck frame with a rear axle mounted on the truck frame;
    a dump body comprising
        a receptacle including a bottom and a front wall and
        a tailgate which with the receptacle define a single interior space, the dump body pivotally connected to the truck frame adjacent to the tailgate;
    a lift system mounted to the truck frame and the dump body for lifting an end of the dump body proximate the front wall between a lowered resting position on the truck frame and an upper raised position; and
    a conveying system positioned at least partly below the bottom of the receptacle and located behind the rear axle and substantially parallel with the tailgate;
    the dump body having at least one opening in alignment with the conveying system, and completely penetrating said receptacle for gravity dispensing of the material from the receptacle.

2. The truck as set forth in claim 1 wherein the dump body has at least one sidewall and the opening is in the sidewall.

3. The truck as set forth in claim 1 wherein the dump body has a pair of sidewalls and a pair of openings, with one of the openings in each of the sidewalls.

4. The truck as set forth in claim 1 wherein the opening is in the bottom.

5. The truck as set forth in claim 1 wherein the dump body has a pair of openings in the bottom.

6. The truck as set forth in claim 1 further comprising a spreader system mounted on the dump body and extending below the opening to spread material discharged by the conveying system.

7. The truck as set forth in claim 1 further comprising at least one door adjustably connected to the dump body, the door moveable between a first position covering the opening and a second position exposing the opening.

8. The truck as set forth in claim 7 wherein the door can be moved to an intermediate position between the first and second positions.

9. The truck as set forth in claim 1 wherein the conveying system comprises an endless conveyor.

10. The truck as set forth in claim 1 wherein the conveying system comprises an auger system.

11. A dump body for hauling, dumping, and dispensing aggregate material when pivotally mounted on a truck frame having front and rear ends, a longitudinal centerline, and front and rear axles supported from the frame, wherein the dump body comprises:
    a receptacle having a floor which includes a back edge locatable rearward of the rear axle, a pair of sidewalls extending from and on opposite sides of the floor, and a front wall extending from the floor and between the sidewalls;
    a back wall spanning said sidewalls at said back edge and thereby defining with the receptacle a single interior space extending from the front wall to the back wall, for holding said material;
    a conveying system mounted in the floor rearward of the rear axle and extending at least partly below the floor between said opposing sides of the floor along a conveying axis oriented transversely to the frame longitudinal centerline;
    at least one dispensing passage substantially intersecting the conveying axis and completely penetrating said receptacle, for gravity dispensing of the conveyed material from the receptacle; and
    wherein the passage Penetrates the floor.

12. A dump body for hauling, dumping, and dispensing aggregate material when pivotally mounted on a truck frame having front and rear ends, a longitudinal centerline, and front and rear axles supported from the frame, wherein the dump body comprises:
    a receptacle having a floor which includes a back edge locatable rearward of the rear axle, a pair of sidewalls extending from and on opposite sides of the floor, and a front wall extending from the floor and between the sidewalls;
    a back wall spanning said sidewalls at said back edge and thereby defining with the receptacle a single interior space extending from the front wall to the back wall, for holding said material;
    a conveying system mounted in the floor rearward of the rear axle and extending at least partly below the floor between said opposing sides of the floor along a conveying axis oriented transversely to the frame longitudinal centerline;
    at least one dispensing passage substantially intersecting the conveying axis and completely penetrating said receptacle, for gravity dispensing of the conveyed material from the receptacle; and
    wherein the receptacle has a pair of passages penetrating the floor.

13. A dump body for hauling, dumping, and dispensing aggregate material when pivotally mounted on a truck frame having front and rear ends, a longitudinal centerline, and front and rear axles supported from the frame, wherein the dump body comprises:

a receptacle having a floor which includes a back edge locatable rearward of the rear axle, a pair of sidewalls extending from and on opposite sides of the floor, and a front wall extending from the floor and between the sidewalls;

a back wall spanning said sidewalls at said back edge and thereby defining with the receptacle a single interior space extending from the front wall to the back wall, for holding said material;

a conveying system mounted in the floor rearward of the rear axle and extending at least partly below the floor between said opposing sides of the floor along a conveying axis oriented transversely to the frame longitudinal centerline;

at least one dispensing passage substantially intersecting the conveying axis and completely penetrating said receptacle, for gravity dispensing of the conveyed material from the receptacle; and at least one door adjustably connected to the receptacle, the door movable between a first position covering the passage and a second position exposing the passage and including an intermediate position between the first and second positions.

* * * * *